(12) United States Patent
Clark et al.

(10) Patent No.: US 6,822,370 B2
(45) Date of Patent: Nov. 23, 2004

(54) PARALLEL PLATE ELECTROSTATIC ACTUATION OF MEMS MIRRORS

(75) Inventors: William A. Clark, Fremont, CA (US); Thor Juneau, Berkeley, CA (US); James Doscher, Westford, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/092,193

(22) Filed: Mar. 6, 2002

(65) Prior Publication Data

US 2003/0168928 A1 Sep. 11, 2003

(51) Int. Cl.[7] ................................................. H02N 1/00
(52) U.S. Cl. ...................................................... 310/309
(58) Field of Search ......................................... 310/309

(56) References Cited

U.S. PATENT DOCUMENTS

| | | | | |
|---|---|---|---|---|
| 5,563,466 A | * | 10/1996 | Rennex et al. | ............... 310/309 |
| 5,709,802 A | * | 1/1998 | Furuhata et al. | ................ 216/2 |
| 6,329,738 B1 | * | 12/2001 | Hung et al. | .................. 310/309 |
| 6,388,359 B1 | * | 5/2002 | Duelli et al. | ................. 310/309 |
| 6,495,893 B2 | * | 12/2002 | Lin et al. | .................... 257/415 |
| 6,504,118 B2 | * | 1/2003 | Hyman et al. | .............. 200/181 |
| 6,545,385 B2 | * | 4/2003 | Miller et al. | ................. 310/309 |

* cited by examiner

*Primary Examiner*—Mark Budd
(74) *Attorney, Agent, or Firm*—Vierra Magen Marcus Harmon & DeNiro LLP

(57) ABSTRACT

A microactuator is disclosed including one or more stationary plates formed on a substrate, a mirror base plate on which a mirror is formed, and one or more actuation plates coupled to the mirror base plate by one or more microspring mechanisms. The mirror base plate, the one or more actuation plates and the one or more microspring mechanisms are suspended over the stationary plates by one or more anchors. The stationary plates and the actuation plates are formed of a doped material so as to be electrically conductive. Upon application of a voltage potential between the respective plates, the actuation plates are pulled down toward the stationary plates, thus exerting a drive force on the base mirror plate to actuate the mirror between switching positions.

14 Claims, 12 Drawing Sheets

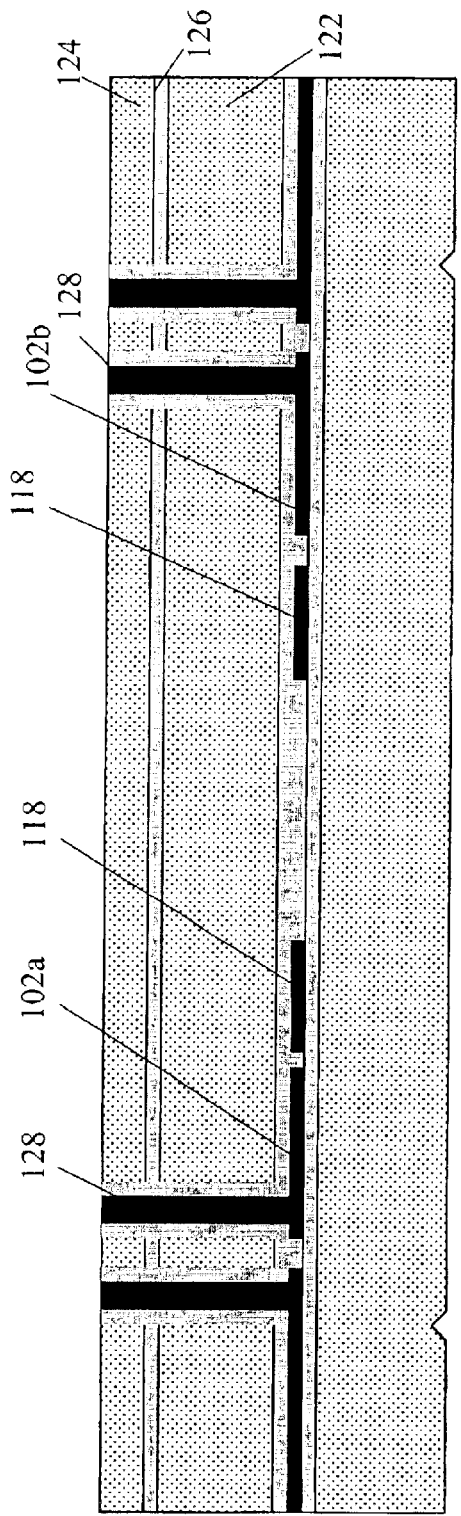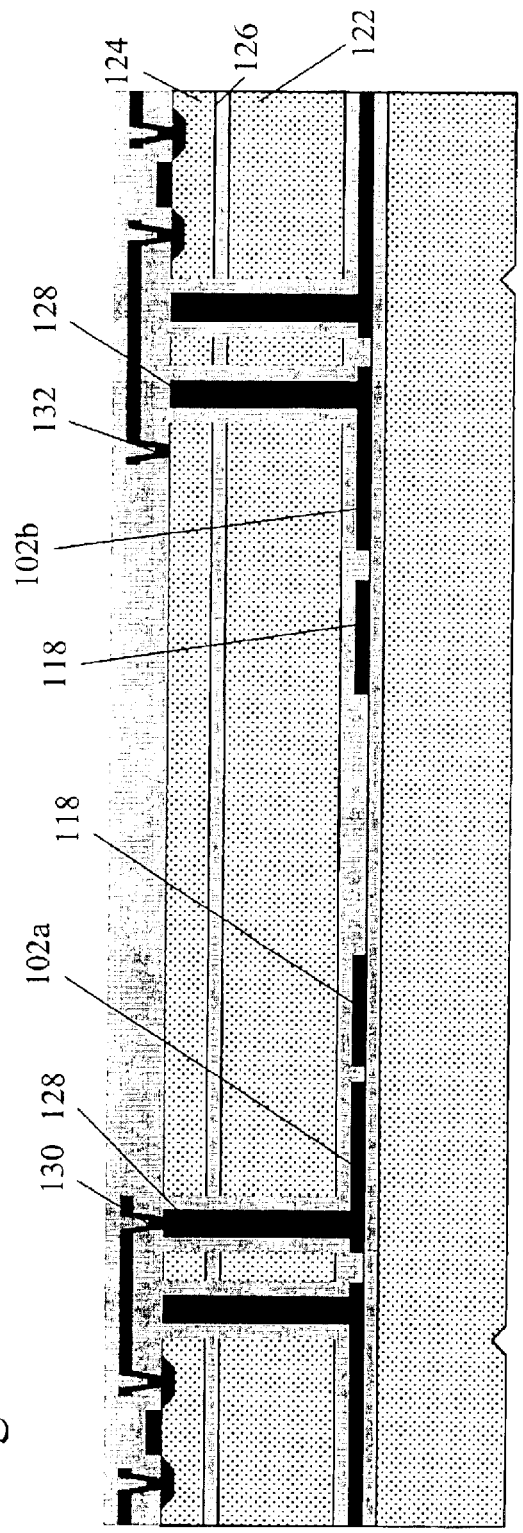
Fig. 23
Fig. 24

PARALLEL PLATE ELECTROSTATIC ACTUATION OF MEMS MIRRORS

CROSS REFERENCE TO RELATED DOCUMENT

The present application is related to Disclosure Document No. 482,279, entitled, "Parallel Plate Electrostatic Actuation of MEMS Mirrors," filed in the United States Patent and Trademark Office on Nov. 7, 2000, which Disclosure Document is incorporated by reference herein in its entirety.

BACKGROUND OF THE INVENTION

1. Field of the Invention

This invention relates generally to the field of a microelectromechanical system (MEMS), and in particular to an electrostatic MEMS device including one or more plates mechanically coupled to a mirror or the like to increase the electrostatic forces for actuating the mirror.

2. Description of the Related Art

MEMS devices offer significant advantages over conventional electromechanical systems with respect to their application, size, power consumption and cost of manufacture. Moreover, leveraging off of the significant progress in the manufacture of integrated circuits on silicon substrates over the past two decades, MEMS devices may be batch processed and packaged together with other IC devices using standard integrated processing techniques and with minimal additional processing steps.

While MEMS devices may be micromachined according to a variety of methodologies, a MEMS device may be formed by applying a thin film layer on a substrate, covering the film with a layer of photoresist, masking the photoresist in the pattern of the desired device features for that layer, and then etching away the undesired portions of the thin film layer. This deposition and photolithographic definition process may be repeated to apply successive etched thin film layers on the substrate until the micromechanical device is formed. A final release etching step is typically performed which removes material from within and around the micromechanical device to release the device so that it can perform its mechanical function. Electrical connections are often also made to the device to allow controlled movement of, or sensing through the device. The materials from which the layers are formed are selected to control the mechanical, electrical and/or chemical response of the layer and overall device.

One type of MEMS device is a parallel plate electrostatically-actuated mirror for use in an optical switching array or the like. Such a device, represented schematically in FIG. 1A, in general comprises a pair of spaced apart plates or electrodes 20 formed on the substrate 22, with one being stationary and the other being cantilevered so that the free end pivots toward or away from the fixed plate. The movable plate is coated with a reflective material, such as for example gold, to act as the mirror.

A known voltage potential V is applied across the electrodes 20, which voltage generates an electrostatic attractive force between the electrodes. Depending on the modulus of elasticity of the flexible electrode and the electrostatic force generated across the electrodes, the free end of the flexible electrode will move a fixed distance to accomplish some associated mechanical actuation.

In particular, referring to FIG. 1B, for a flat plate with a flexible suspension and ignoring fringing effects, the electrostatic bending force, or moment, $M_e$ generated in the top, flexible electrode 20 is given by the relationship:

$$M_e = \frac{1}{2}\left(\frac{\partial C}{\partial \theta}\right) \cdot V^2,$$

where C is the capacitance between the electrodes and V is the applied voltage potential across the electrodes. The change in capacitance with a change in the angle $\theta$ is approximated by:

$$\frac{\partial C}{\partial \theta} = -\varepsilon \frac{W}{\theta^2}\ln\left(\frac{\alpha}{\alpha-\theta}\right) + \varepsilon \frac{W}{\theta(\alpha-\theta)},$$

where $\varepsilon$ is the electrical permitivity of the dialectric (generally air) between the electrodes, W is the width of the electrode, and $\alpha$ is the ratio of the initial gap to the electrode length ($g_0/L$). Thus, the electrostatic bending force $M_e$ exerted on the flexible electrode can be expressed as:

$$M_e = -\frac{\varepsilon}{2}\frac{WV^2}{\theta^2}\ln\left(\frac{\alpha}{\alpha-\theta}\right) + \frac{\varepsilon}{2}V^2\left(\frac{W}{\theta(\alpha-\theta)}\right).$$

Thus, the flexible electrode in a MEMS actuator will displace through an angle $\theta$ upon introduction of an actuation voltage depending on the magnitude of the voltage, the capacitance of the electrodes and mechanical properties of the flexible electrode.

A characteristic to electrostatically-actuated mirrors of the type described above is that, at actuation voltages and/or displacements above a threshold level, the electrostatic force between the electrodes becomes too strong and the flexible electrode collapses against the fixed electrode, a phenomena referred to as "pull in". It has been analytically determined that pull down occurs at a voltage causing a displacement of:

$$\theta \geq \frac{0.44 g_0}{L}.$$

Thus, where the voltage in the system shown in FIGS. 1A and 1B causes the flexible electrode to move through an angle $\theta$ greater than 0.44 of the ratio of the initial gap to the length of the electrode, electrode pull in occurs. While it is known to provide an additional capacitor in series with the above electrostatic actuator to prevent electrode pull in, the maximum displacement is in any event limited to the initial gap length, which must be kept relatively small, generally on the order of 1 to 100 microns ($\mu$), to avoid having to use excessively large actuation voltages.

Moreover, due to the relatively small size of the mirror and plates, and the fact that the plates must be relatively far apart to achieve large actuation angles, electrostatic actuation requires excessive voltages to achieve a satisfactory deflection of the mirror. Actuating a small mirror can require very large voltages, for example in excess of 200 volts. Such high voltages are difficult to generate and control using only small, low power semiconductor-based electronics.

SUMMARY OF THE INVENTION

It is therefore an advantage of the present invention to provide a system capable of actuating a mirror between at least two positions using lower voltages.

It is a further advantage of the present invention to generate relatively large actuation forces for moving a mirror between at least two positions using small, low power semiconductor-based electronics.

A still further advantage is that a mirror may be actuated through a relatively large angle using small, low power semiconductor based electronics.

It is another advantage of the present invention to provide a system capable of actuating a mirror between at least two positions which may be easily implemented using conventional micromachining techniques.

These and other advantages are provided by the present invention which in preferred embodiments relates to an electrostatic MEMS device for actuating a mirror or the like. The microactuator and mirror may be used for example as a bi-stable switch in an optical switching array. In order to accomplish switching between the two receivers, the microactuator is capable of actuating the mirror between two precisely repeatable positions. The mirror may be actuated to and between greater than two repeatable positions to achieve a plurality of optical switching conditions in alternative embodiments.

One embodiment of the microactuator includes first and second microcapacitors on either side of the mirror base plate. Each microcapacitor includes a stationary plate formed on a substrate, and a movable, actuation plate anchored to the substrate via microsprings and supported over the associated stationary plate. Upon application of a voltage to a microcapacitor, an electrostatic force is generated between the plates that causes the actuation plate of that microcapacitor to rotate toward the stationary plate. The actuation plates are in turn coupled to either side of the mirror base plate by microsprings between the actuation plates and mirror base plate. Thus, as an actuation plate rotates under a generated electrostatic force, torque from the actuation plate is transmitted as a downward force on the mirror base plate.

While the length of the actuation plates may vary in alternative embodiments, the plates may be two to ten times longer than the mirror length. For a given applied voltage potential, the large actuation plates increase the overall electrostatic force that may be applied to the mirror base plate and mirror.

BRIEF DESCRIPTION OF THE DRAWINGS

The present invention will now be described with reference to the drawings in which:

FIGS. 21–26 are side views of the microactuator according to the present invention in various stages of fabrication.

DETAILED DESCRIPTION

Embodiments of the present invention will now be described with reference to FIGS. 2–26, which in preferred embodiments relate to an electrostatic MEMS device including one or more plates mechanically coupled to a mirror or the like to increase the electrostatic forces for actuating the mirror. A preferred embodiment of the invention is described hereinafter for actuating a mirror on a chip in an optical switching array. However, it is understood that the present invention may be used as a microactuator in a variety of other applications including optical beam steering, optical displays, disk drive head actuators and a wide variety of other medical and mechanical microactuation systems. Moreover, the present invention may be embodied in many different forms and should not be construed as being limited to the embodiments set forth herein; rather these embodiments are provided so that this disclosure will be thorough and complete and will fully convey the invention to those skilled in the art. Indeed, the invention is intended to cover alternatives, modifications and equivalents of these embodiments, which will be included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details. In other instances, well known methods, procedures, components, and circuits have not been described in detail as not to unnecessarily obscure aspects of the present invention.

Figure 1A:
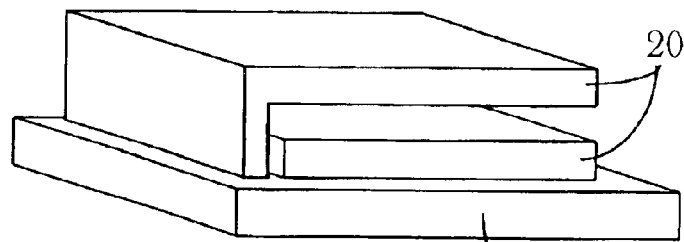
FIG. 1A is a prior art schematic representation of an electrostatically-actuated mirror.
Figure 1B:
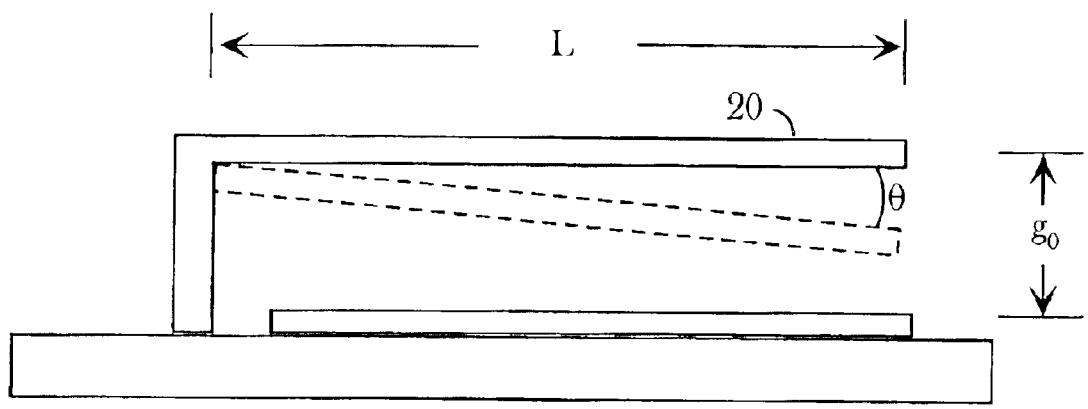
FIG. 1B is a prior art side view of the electrostatically-actuated mirror shown in FIG. 1.
Figure 2:
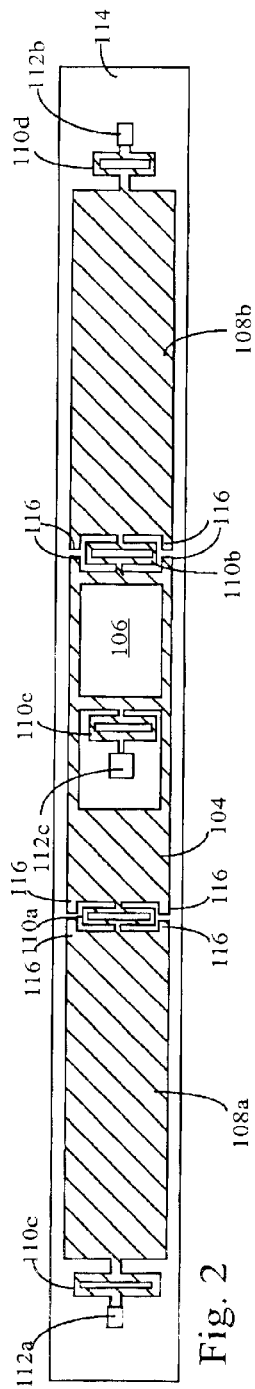
FIG. 2 is a top view of a microactuator according one embodiment of the present invention.

Referring now to FIG. 2, there is shown a microactuator 100 for actuating a mirror 106. The mirror may be used for example as a bi-stable switch in an optical switching array. In such an embodiment, a light signal (not shown) is reflected off the mirror 106 to, for example, first and second receivers (not shown) depending on the position of the mirror. Instead of receivers, the mirror 106 may be used to direct the optical signal to other mirrors, prisms, filters, etc. In order to accomplish switching between the two receivers, the microactuator is capable of actuating the mirror between two precisely repeatable positions as explained hereinafter. It is understood that the mirror may be actuated to and between greater than two precisely repeatable positions to achieve a plurality of optical switching conditions in alternative embodiments. In a further alternative embodiment, the mirror 106 may be controllably actuated to any analog position between its extreme end positions.

Referring to FIGS. 2–6, a microactuator 100 according to the present invention in general includes one or more stationary plates 102 formed on a substrate, a mirror base plate 104 on which a mirror 106 is formed, and one or more actuation plates 108 coupled to the mirror base plate 104 by one or more microspring mechanisms 110. The mirror base plate 104, the one or more actuation plates 108 and the one or more microspring mechanisms 110 are suspended over the stationary plates by one or more anchors 112. The stationary plates 102 and the actuation plates 108 are formed of a doped material so as to be electrically conductive. As explained in greater detail below, upon application of a voltage potential between the respective plates 102, 108, the actuation plate is pulled down toward the stationary plate, thus exerting a drive force on the base mirror plate to actuate the mirror between switching positions.

Figure 3:
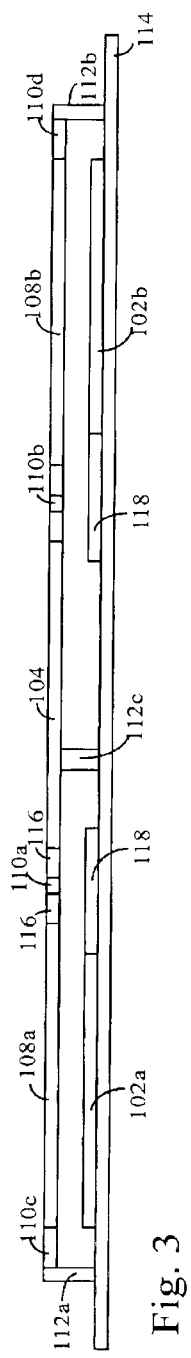
FIG. 3 is a side view of the microactuator of FIG. 2 in an unbiased position.
Figure 4:
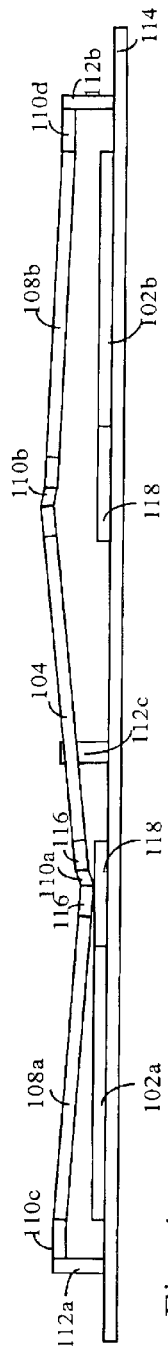
FIG. 4 is a side view of the microactuator of FIG. 2, with the left actuation plate being actuated.
Figure 5:
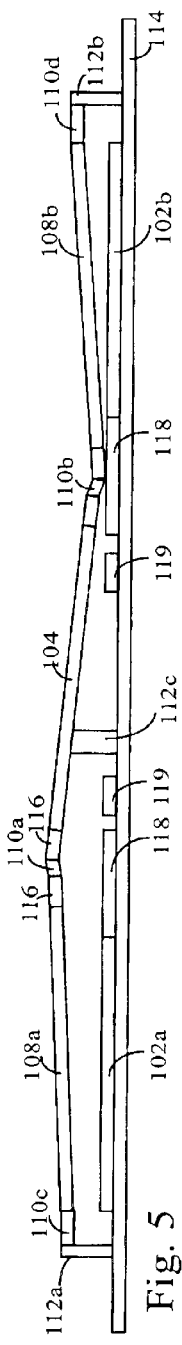
FIG. 5 is a side view of the microactuator of FIG. 2, with the right actuation plate being actuated.

Referring specifically to the top view of FIG. 2 and side views of FIGS. 3 through 5, a first embodiment of microactuator 100 includes left and right stationary plates 102a and 102b formed on a substrate 114. The microactuator 100 further includes left and right actuation plates 108a and 108b affixed to the mirror base plate 104 via a pair of spring mechanisms 110a and 110b. The left actuation plate 108a is in turn cantilevered over the left stationary plate 102a via a microspring mechanism 110c affixed to an anchor 112a. The right actuation plate 108b is in turn cantilevered over the right stationary plate 102b via a microspring mechanism 110d affixed to an anchor 112b. The mirror base plate 104 is anchored to the substrate 114 via a microspring mechanism 110e affixed to an anchor 112c.

While the length of the actuation plates 108a and 108b may vary in alternative embodiments, the plates may be two to ten times longer than the mirror base plate length (the plates are not drawn to scale in the figures). As previously explained, electrostatic bending force in a parallel plate microactuator may be approximated by:

$$M_e = -\frac{\varepsilon}{2}\frac{WV^2}{\theta^2}\ln\left(\frac{\alpha}{\alpha-\theta}\right) + \frac{\varepsilon}{2}V^2\left(\frac{W}{\theta(\alpha-\theta)}\right),$$

where $\alpha$ is the ratio of the initial gap ($g_o$) between the plates to the length (L) of the plates. Thus, for a given voltage potential, V, a longer electrode (i.e., large length L) will produce a larger electrostatic bending force with smaller deflection angles $\theta$. This is explained in greater detail hereinafter.

FIG. 4 illustrates deflection of the microactuator upon application of a voltage potential across the left stationary and actuation plates 102a and 108a. As the actuation plate is anchored by spring mechanism 110c to anchor 112a, the voltage potential causes the distal end (relative to anchor 112a) of the actuation plate 108a to rotate toward the stationary plate 102a as shown. Spring mechanism 110c flexes to allow is such rotation.

Figure 6:
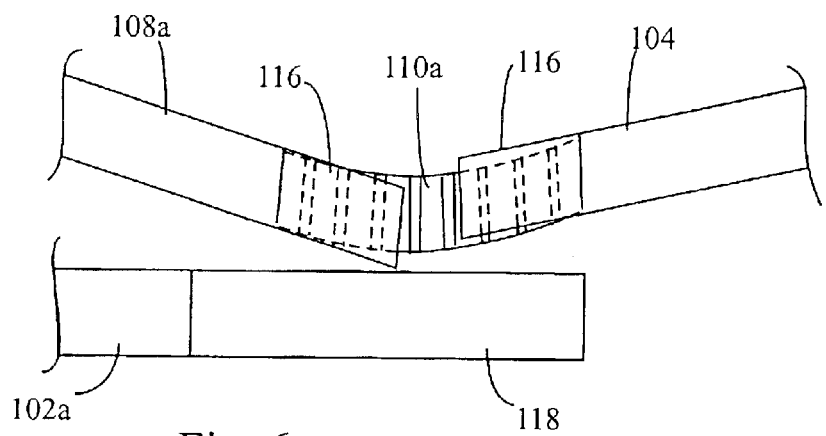
FIG. 6 is an enlarged side view of a junction between an actuation plate and base plate, illustrating the feet and spring mechanisms located therebetween according to the present invention.

As the actuation plate approaches the stationary plate, the force generated between the plates increases. If the plates get too close together, the actuation plate bends and collapses against the stationary plate. The present invention prevents this in a number of ways. First, as shown in FIGS. 2–5 and in detail in FIG. 6, the ends of base plate 104, and the ends of the actuation plates 108a, 108b adjacent thereto, each include a pair of spaced apart feet 116 which extend off the end of the respective plates. As shown in FIG. 6, when for example the actuation plate 108a is pulled downward, the feet 116 prevent the plate 108a from contacting the electrode 102a, thus maintaining a spacing between the actuation plates 108a, 108b and the electrodes 102a, 102b. The feet 116 also prevent stiction between the actuation plates and a touch-down plate 118 by providing an essentially two point contact between the actuation plates and touch-down plates, as opposed to a line of contact which would otherwise occur without the feet 116. Moreover, as seen in FIG. 6, the microspring mechanisms between adjacent plates (i.e., spring mechanisms 110a and 110b) bow downward when the associated actuation plate is pulled downward. The feet 116 further prevent the mircrospring mechanisms from contacting the touch-down plates upon pull down of the actuation plates and base plate. The touch-down plates 118 are in electrical connection with the actuation plates 108a, 108b via wires (not shown) so as to prevent an electrical short of the actuation plates upon touching down on touch-down plates 118.

As further shown in FIG. 6, plate collapse is further prevented by providing the distal end of the stationary plate 102a offset from the distal end of the actuation plate. In particular, if the ends of the respective plates were coterminous with each other, significant electrostatic forces could result in collapse of the actuation plate, even if the feet 116 prevent contact of the plate ends. The offset of the respective plates prevents generation of excessive electrostatic forces.

In the embodiment of FIGS. 2–6, the stiffness of microspring mechanisms 110a–110d and the voltages applied to the actuation and stationary plates 108a and 102a are selected so that the electrostatic force generated upon application of the voltage potential is greater than the mechanical force due primarily to the stiffness of microsprings 110a, 110b and 110e. Thus, upon application of the voltage potential, the feet 116 are pulled down into fixed contact with the touch-down plate 118. This ensures fixed, repeatable pivot positions of the actuation plate and mirror base plate each time the voltage potential is applied. The voltages applied to the plates are also sufficiently low so that, with the aid of feet 116 and offset of the respective plates, there is no danger of plate collapse.

Although the respective microspring mechanisms 110a-110e show only one or two microspring coils, in a preferred embodiment, each microspring mechanism may include a plurality of coils. For example, in one embodiment, the microspring mechanisms 110a, 110b and 110e may comprise eight coils, which coils collectively impart a stiffness to each microspring mechanism 110a, 110b and 110e of between $0.5 \times 10^8$ Nm/rad and $2 \times 10^{-8}$ Nm/rad, and optimally about $1 \times 10^{-8}$ Nm/rad. In one embodiment microspring mechanisms 110c and 110d may comprise two coils, which coils collectively impart a stiffness to each microspring mechanism 110c and 110d of between $2 \times 10^{-8}$ Nm/rad and $8 \times 10^{-8}$ Nm/rad, and optimally about $4 \times 10^{-8}$ Nm/rad. It is understood that the number of microspring coils, and resultant stiffness values may be greater or lesser than the values set forth above in alternative embodiments.

As seen in FIG. 4, the pivoting of actuation plate 108a exerts a clockwise torque on microspring mechanism 110a, which in turn causes a counterclockwise rotation (from the perspective of FIGS. 3–5) of mirror base plate 104. Flexing of microspring 110a converts the torque from actuation plate 108a substantially into a linear force on base plate 104.

Similarly, the pivoting of mirror base plate 104 exerts a counterclockwise torque on microspring mechanism 110b, which in turn causes a clockwise rotation of the right actuation plate 108b. Flexing of microspring 110b converts the torque from base plate 104 substantially into a linear force on the right actuation plate.

It was a problem in the prior art that it was difficult to obtain relatively large pivot angles of the mirror with only low actuation voltages. One reason was that, in order to obtain large pivot angles, the mirror base plate had to be spaced a relatively large distance from the stationary electrode. The large spacing required large actuation voltages to achieve the desired electrostatic forces.

This problem is overcome by the present invention. The actuation plates 108a and 108b and mirror base plate 104 may still have relatively large spacing from the stationary plates 102a and 102b to allow a large pivot angles of the mirror. However, owing to the long length of the actuation plates, the actuation plates rotate through relatively small angles, upon application of relatively low voltages, which actuation plates in turn rotate the mirror base plate and mirror through a relatively large angle. In one embodiment, the voltage potential between the respective plates may range between 150 volts and 250 volts, and optimally around 200 volts. It is understood that the voltages may be greater or lesser than the values set forth above in alternative embodiments.

As indicated above, upon application of a voltage potential between the stationary and actuation plates 102a and 108a, the mirror base plate 104 is moved to a fixed, repeatable position. Without an applied voltage, the mirror base plate returns to its fixed and repeatable unbiased position, i.e., parallel to the stationary plates 102a and 102b. Thus, in one mode of operation, the microactuator shown in FIGS. 2–5 is capable of operating as a precision bistable optical switch with relatively low drive voltages.

Additionally, a voltage potential may be applied to right stationary plate 102b and right actuation plate 108b to cause actuation of the mirror base plate 104 between the unbiased position and a biased position as shown in FIG. 5. The components on the plates 102b and 108b are the mirror image structurally and operationally of the components on the plates 102a and 108a. Similarly, the operation of the microactuator upon a voltage potential to the plates 102b and 108b is substantially the mirror image of the operation of the microactuator upon a voltage potential to the plates 102a and 108a. Thus, the microactuator shown in FIGS. 2–5 is further capable of operating as an optical switch with three precisely repeatable positions.

The embodiment shown in FIGS. 4 and 6 may be used to position the mirror 106 to one of two fully pivoted positions, or anywhere in between (i.e., analog sensing). As shown in FIGS. 4 and 6, although rotated to a fixed and repeatable position, the mirror base plate does not snap down into contact with the substrate 114. However, in the embodiment shown in FIG. 5, additional electrode pads 119 may be provided on substrate 114 under the respective ends of the mirror base plate so that, when the mirror base plate is pulled close, the electrostatic attraction between the mirror base plate and pad 119 pulls the mirror base plate the final distance into contact with the touch-down plate 118. Thus, the embodiment of FIG. 5 differs from the embodiment of FIG. 4 in that the mirror can be snapped down into contact with the touch-down plates 118.

Figure 7:
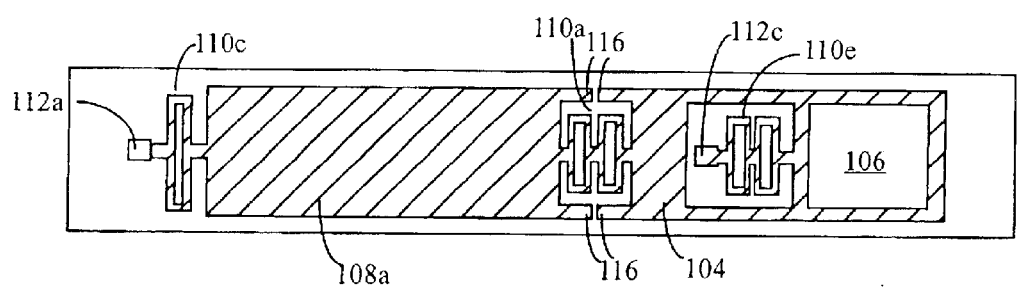
FIG. 7 is a top view of a microactuator according to a further alternative embodiment of the present invention.

The further alternative embodiment shown in FIG. 7 is identical to the embodiment shown in FIG. 2, with the exception that the right stationary plate 102b and actuator plate 108b, as well as the components associated therewith, have been omitted. This embodiment is capable of operating as a precision bistable optical switch upon application of a voltage potential to plates 102a and 108a.

Figure 8:
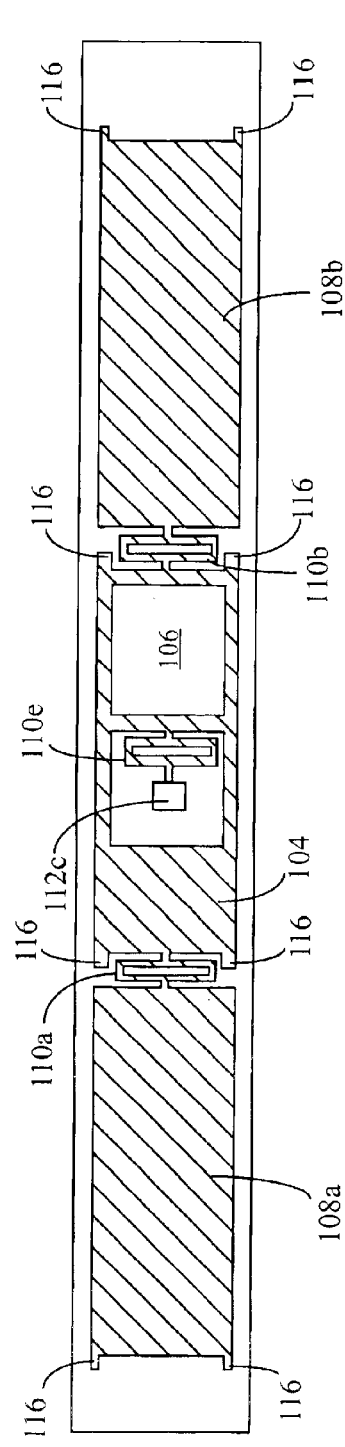
FIG. 8 is a top view of a microactuator according to a still further alternative embodiment of the present invention.
Figure 9:
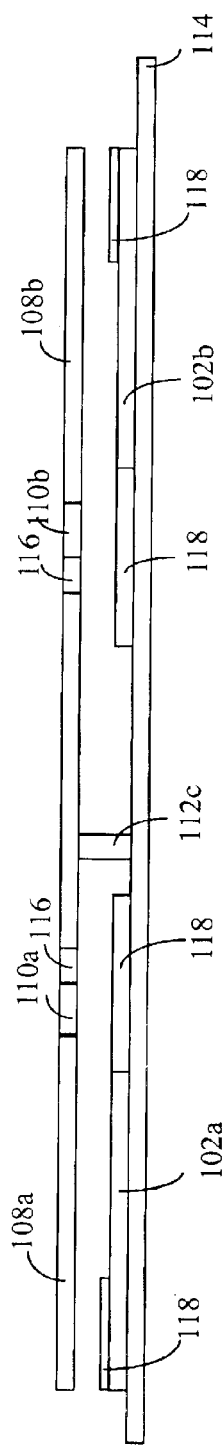
FIG. 9 is a side view of the microactuator of FIG. 8 in an unbiased position.
Figure 10:
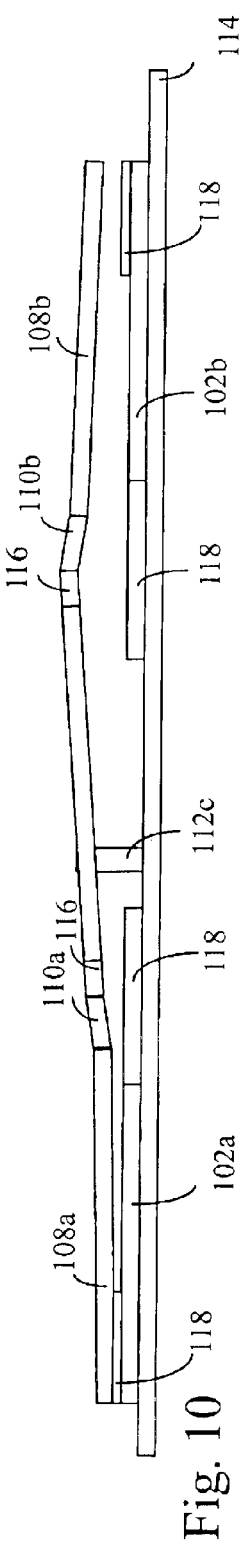
FIG. 10 is a side view of the microactuator of FIG. 8, with the left actuation plate being actuated.

The top view of FIG. 8 and the side views of FIGS. 9 and 10 illustrate a further embodiment of microactuator 100. This embodiment is substantially similar in structure to the embodiment of FIGS. 2–5, with the exception that the anchors and spring mechanisms at the far ends of the actuation plates 108a, 108b have been omitted. Thus, as seen in FIG. 9, the ends of the actuation plates 108a, 108b are not anchored to the substrate 114, but instead are freely suspended thereover. Upon application of a voltage potential, for example to the plates 102a, 108a on the left side as shown in FIG. 10, the actuation plate 108a is pulled into contact or near contact with the touch-down plate 118 on stationary plate 102a, thus resulting in rotation of the mirror base plate 104 as shown and as described above.

It is understood that the spring mechanisms employed in each of the embodiments of FIGS. 8–10 may include a plurality of microspring coils as described above. The spring constants may also vary as previously described for the various embodiments.

Figure 11:
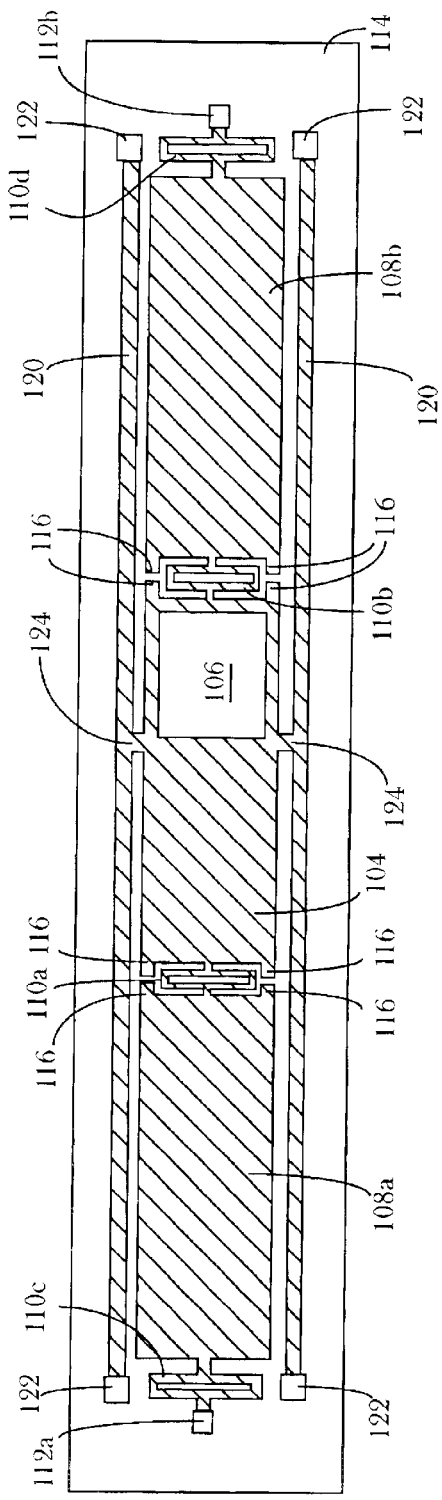
FIG. 11 is a top view of a microactuator according to another alternative embodiment of the present invention.

FIG. 11 illustrates a still further alternative embodiment of the present invention. The embodiment shown is identical to FIG. 2, but the spring 110e and anchor 112c are omitted, and in their place is provided a pair of side rails 120 anchored to the substrate at anchors 122. The side rails 120 are affixed to the mirror base plate 104 at tethers 124. This embodiment operates as in previous embodiments, with the mirror base plate being driven to pivot by actuation plates 108a, 108b as described above. However, in this embodiment, the mirror base plate 104 is anchored to the substrate via the side rails 120.

Figure 12:
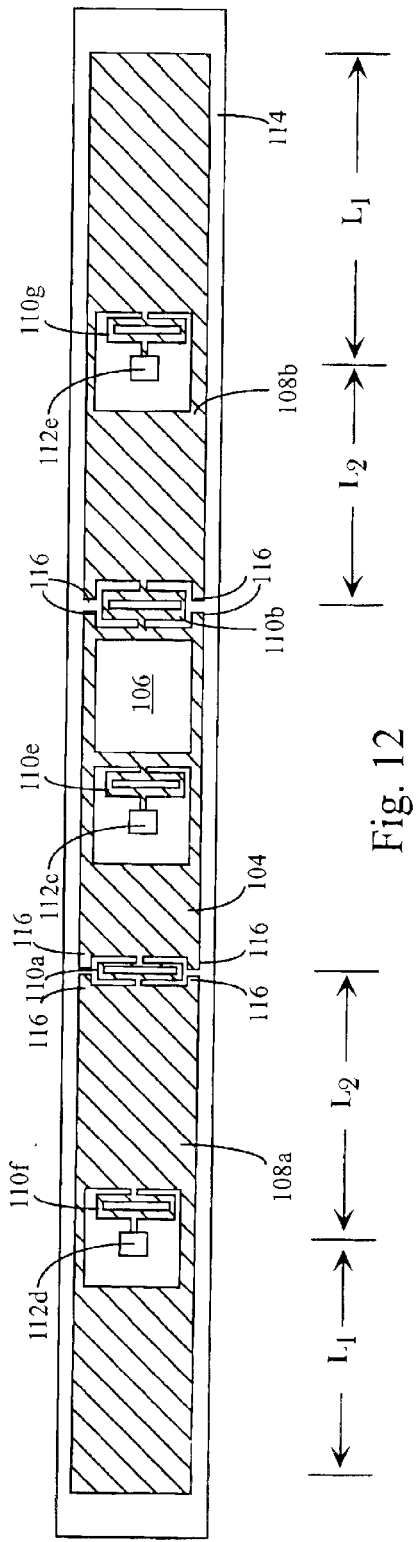
FIG. 12 is a top view of a microactuator according to a still further alternative embodiment of the present invention.

A still further embodiment is shown in FIG. 12. In this embodiment, the actuation plates 108a and 108b each have a single anchor (112d and 112e, respectively) which support the plates. The actuation plate 108a is supported over a pair of stationary electrode plates (not shown), positioned on opposite sides of anchor 112d. Similarly, the actuation plate 108b is supported over a pair of stationary electrode plates (not shown), positioned on opposite sides of anchor 112e. Thus, each of the actuation plates 108a, 108b is capable of a sea-saw motion about the anchors 112d, 112e upon selective application of voltage to the stationary electrodes on either side of anchors 112d and 112e. Alternatively, a single electrode could be used on each end of the device 100. As shown in FIG. 12, the anchors 112d and 112e are positioned approximately in the middle of plates 108a and 108b, respectively (i.e. $L_1 \approx L_2$). However, it is under stood that $L_1 > L_2$ and that $L_1 < L_2$ in alternative embodiments. The embodiment of FIG. 12 may be used to achieve relatively large pivot angles of base plate 104, especially as $L_1$ becomes much greater than $L_2$.

Figure 13:
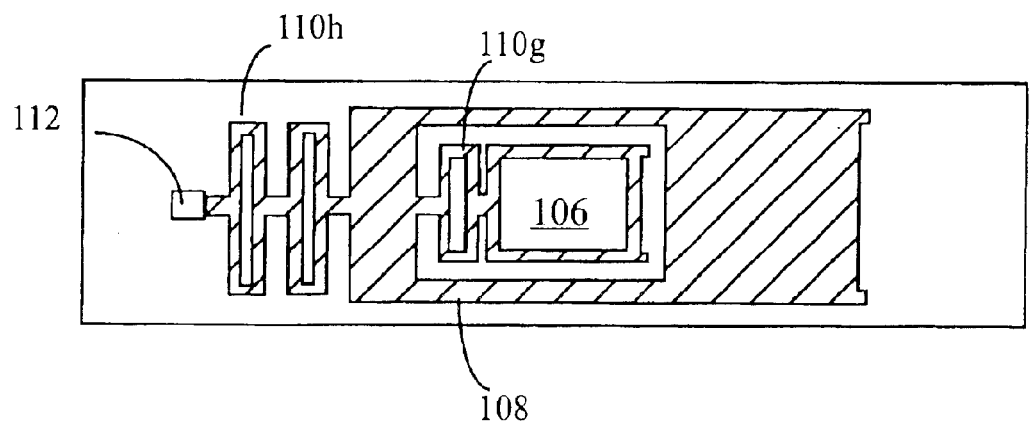
FIG. 13 is a top view of a microactuator according to another embodiment of the present invention.
Figure 14:
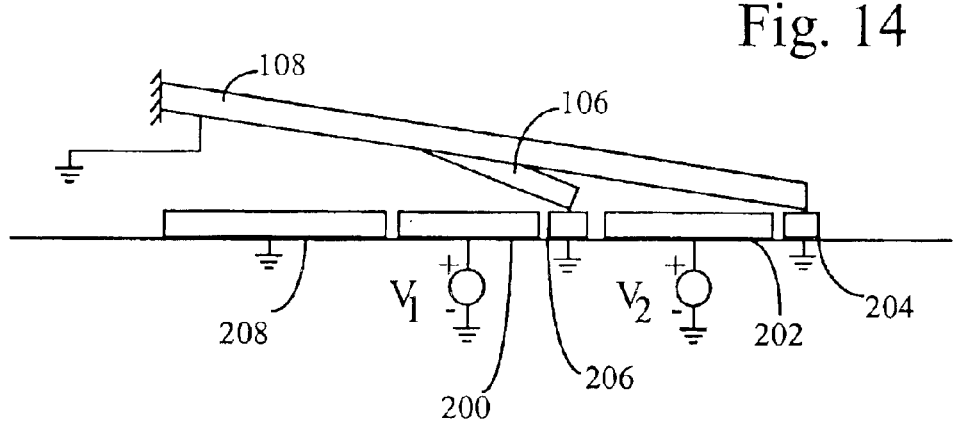
FIG. 14 is a side view of the microactuator shown in FIG. 13.

Still further embodiments of the present invention are shown in FIGS. 13–20. FIGS. 13 and 14 illustrate top and side views, respectively, is of an embodiment of the present invention wherein the mirror 106 is flexibly cantilevered to a plate 108, which plate 108 is in turn flexibly cantilevered to an anchor 112. In particular, mirror 106 is cantilevered to plate 108 via one or more springs 110g. Plate 108 is flexibly cantilevered to anchor 112 via one or more springs 110h.

As seen in FIG. 14, upon application of voltage(s) $V_1$ and $V_2$ to electrodes 200 and 202, respectively, of a base layer, plate 108 is pulled into contact with a first electrode 204 and mirror 106 is pulled down into contact with a second electrode 206. $V_1$ may be equal to or different than $V_2$ in alternative embodiments, and $V_1$ may preferably be applied at the same time or after $V_2$. While plate 108 and electrodes 204, 206 and 208 are shown grounded in FIG. 14, it is understood that the plate 108 and electrodes 200, 202, 208 may receive some other, common voltage in alternative embodiments. As plate 108 is large as explained above, a relatively low voltage $V_2$ may be used to pull the plate 108 toward electrode 200. As the plate moves toward the electrodes, the spacing between mirror 106 and electrode 202 decreases, thus allowing the mirror to be pulled into contact with the electrode 202 with a relatively low voltage $V_2$.

A further advantage of the embodiment of FIGS. 13 and 14 is the relatively large mirror angle which may be obtained using relatively small voltages. Moreover, the embodiment of FIGS. 13 and 14 may be used as a multiposition switch with three stable positions: a first position where no voltages $V_1$ or $V_2$ are applied; a second position where voltage $V_2$ is applied; and a third position where voltages $V_1$ and $V_2$ are applied.

Figure 15:
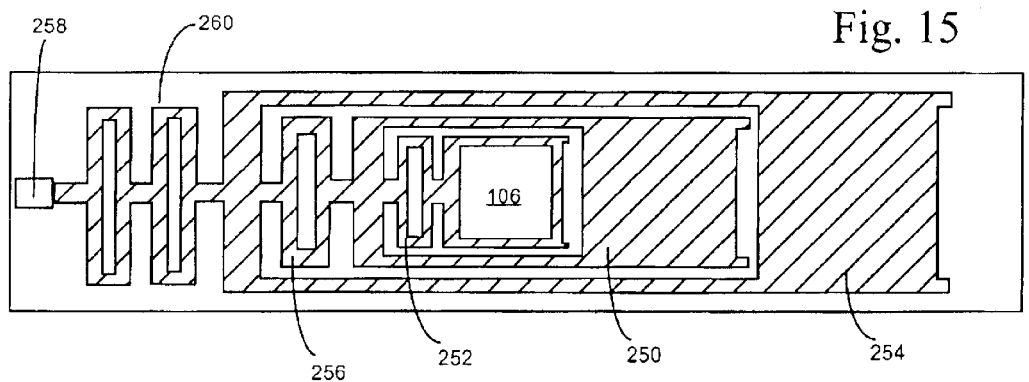
FIG. 15 is a top view of a microactuator according to a further embodiment of the present invention.
Figure 16:
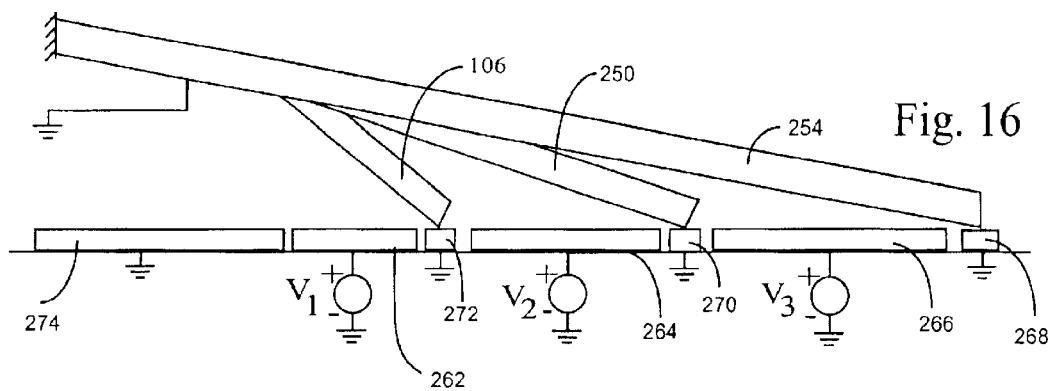
FIG. 16 is a side view of the microactuator shown in FIG. 15.

FIGS. 15 and 16 are similar to the embodiment of FIGS. 13 and 14, except that three cantilevered plates are provided. In particular, mirror 106 is cantilevered to first plate 250 by one or more spring mechanisms 252, and the first plate 250 is in turn cantilevered to a second plate 254 by one or more spring mechanisms 256. The second plate 254 is flexibly cantilevered to an anchor 258 via one or more springs 260.

As seen in FIG. 16, upon application of voltage(s) $V_1$, $V_2$ and $V_3$ to electrodes 262, 264 and 266, respectively, of a base layer, the second plate 254 is pulled into contact with an electrode 268, the first plate 250 is pulled into contact with an electrode 270, and mirror 106 is pulled down into contact with an electrode 272. The respective voltages $V_1$, $V_2$ and $V_3$ may be equal to or different than each other in alternative embodiments. In a preferred embodiment, $V_1$ may be applied at the same time or after $V_2$, and $V_2$ may be applied at the same time or after $V_3$. While plate 254 and electrodes 268, 270, 272 and 274 are shown grounded in FIG. 16, it is understood that the plate 254 and electrodes 268, 270, 272 and 274 may receive some other, common voltage in alternative embodiments.

As with the embodiment of FIGS. 13 and 14, low voltages for a given mirror angle and/or large mirror angles may be accomplished. The embodiment of FIGS. 13 and 14 may additionally be used as a multiposition switch with four stable positions: a first position where no voltages $V_1$, $V_2$ or $V_3$ are applied; a second position where voltage $V_3$ is applied; a third position where voltages $V_2$ and $V_3$ are applied; and a fourth position where voltages $V_1$, $V_2$ and $V_3$ are applied.

Figure 17:
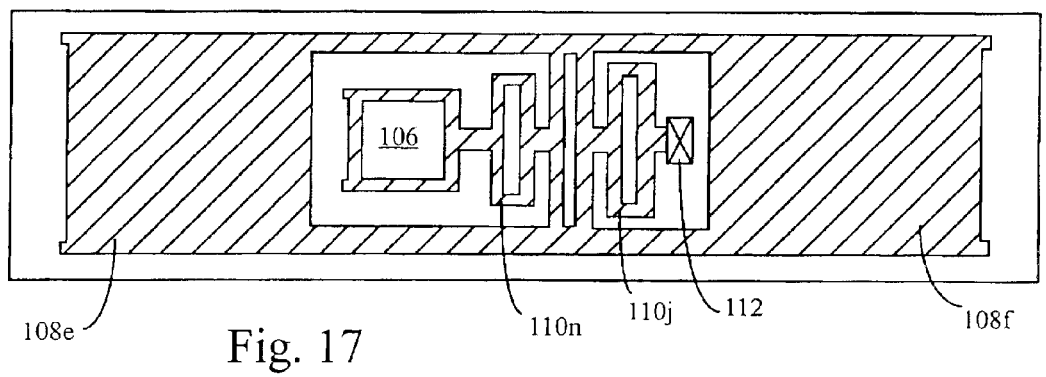
FIG. 17 is a top view of a microactuator according to a further embodiment of the present invention.
Figure 18:
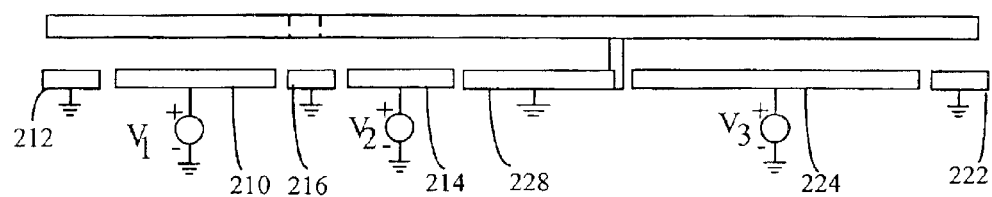
FIG. 18 is a side view of the microactuator shown in FIG. 17.

FIGS. 17 and 18 are similar to the embodiment of FIGS. 13 and 14, except that the assembly is cantilevered at its mid section so as to allow mirror 106 to pivot above and below the plane of the substrate 114. In particular, the assembly includes a pair of plates 108e and 108f that are supported by an anchor 112 off of a first cantilevered suspension 110j. The mirror 106 is in turn cantilevered to the plates 108e, 108f off of a second suspension 110n.

As seen in FIG. 18, in order to pull down mirror 106, a voltage $V_1$ from an electrode 210 may be applied to plate 108e to pull the plate 108e into contact with an electrode 212. In conjunction with the application of $V_1$, a voltage $V_2$ from an electrode 214 is applied to mirror 106 to pull the mirror down into contact with an electrode 216. $V_1$ may be equal to or different than $V_2$ in alternative embodiments, and $V_2$ may preferably be applied at the same time or after $V_1$.

Alternatively, the mirror 106 may be pivoted out of the plane of substrate 114. This may be accomplished by application of a voltage $V_3$ to an electrode 224 to create an electrostatic force between the electrode 224 and plate 108f that pulls plate 108f into contact with an electrode 222. In so doing, mirror 106 pivots upwards, out of the plane of the substrate 114.

As in the embodiment of FIGS. 13 and 14, relatively low voltage(s) $V_1$ or $V_3$ may be used to pull the plates 108e or 108f into contact with the adjacent electrodes. As plate 108e moves toward the electrode 212, the spacing between the mirror 106 and electrode 216 decreases, thus allowing the mirror 106 to be pulled into contact with the electrode 216 with a relatively low voltage $V_2$. A further advantage of the embodiment of FIGS. 17 and 18 is the relatively large mirror angles which may be obtained using relatively small voltages.

Figure 19:
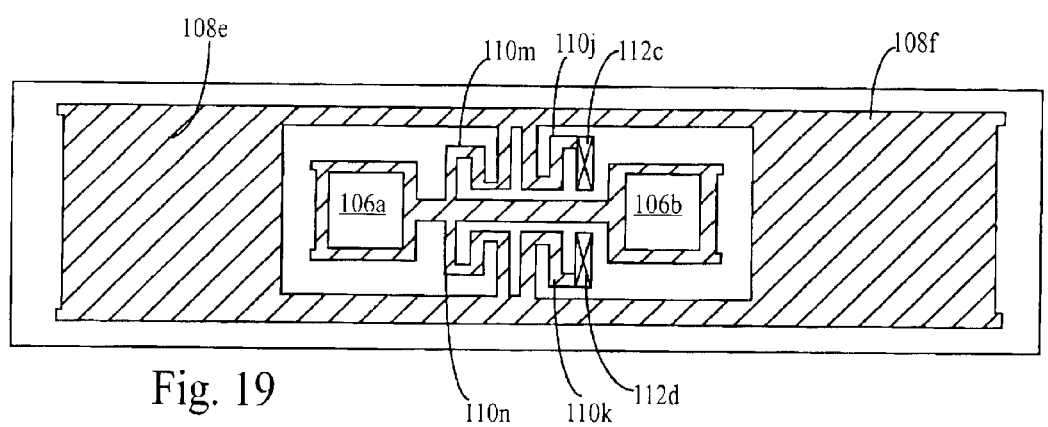
FIG. 19 is a top view of a microactuator according to a further embodiment of the present invention.
Figure 20:
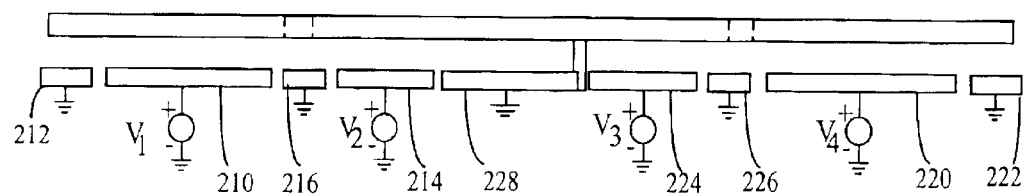
FIG. 20 is a side view of the microactuator shown in FIG. 19.

FIGS. 19 and 20 are similar to the embodiment of FIGS. 17 and 18, except that the assembly includes a pair of mirrors 106a and 106b, each of which being capable of pivoting into contact with the electrodes proximate thereto. In particular, the assembly includes a pair of plates 108e and 108f that are supported by an anchors 112c and 112d off of a first pair of cantilevered suspensions 110j and 110k. The mirrors 106a, 106b are in turn cantilevered to the plates 108e, 108f off of a second pair of suspensions 110m and 110n.

As seen in FIG. 18, in order to pull down mirror 106a, a voltage $V_1$ from an electrode 210 may be applied to plate 108e to pull the plate 108e into contact with an electrode 212. In conjunction with the application of $V_1$, a voltage $V_2$ from an electrode 214 is applied to mirror 106a to pull the mirror down into contact with an electrode 216. $V_1$ may be equal to or different than $V_2$ in alternative embodiments, and $V_2$ may preferably be applied at the same time or after $V_1$.

Alternatively, in order to pull down mirror 106b, a voltage $V_4$ from an electrode 220 may be applied to plate 108f to pull plate 108f into contact with an electrode 222. At the same time or thereafter, a voltage $V_3$ from an electrode 224 may be applied to mirror 106b to pull mirror 106b into contact with an electrode 226. $V_3$ may be equal to or different than $V_4$ in alternative embodiments, and $V_3$ may preferably be applied at the same time or after $V_4$. While plate 108f and electrodes 212, 216, 222, 226 and 228 are shown grounded in FIG. 20, it is understood that the plate 108e and the above named electrodes may receive some other, common voltage in alternative embodiments.

As in the embodiment of FIGS. 13 and 14, relatively low voltage(s) $V_1$ or $V_4$ may be used to pull the plates 108e or 108f into contact with the adjacent electrodes. As plate 108e moves toward the electrode 212, the spacing between the associated mirror 106a and electrode 216 decreases, thus allowing the mirror 106a to be pulled into contact with the electrode 216 with a relatively low voltage $V_2$. The same is true with respect to mirror 106b and voltage $V_3$. A further advantage of the embodiment of FIGS. 19 and 20 is the relatively large mirror angles which may be obtained using relatively small voltages.

In each of the embodiments shown and discussed above, it is understood that the actuation plate(s) and/or the mirror (s) need not be pulled all the way down into contact with the associated electrode positioned thereunder. The voltages applied may be such that the generated electrostatic force only partially deflects the plates(s)/mirror(s). Thus, any analog position of the mirror may be controllably achieved between the unbiased position of the mirror and the position of the mirror when in contact with its associated electrode.

Figure 21:
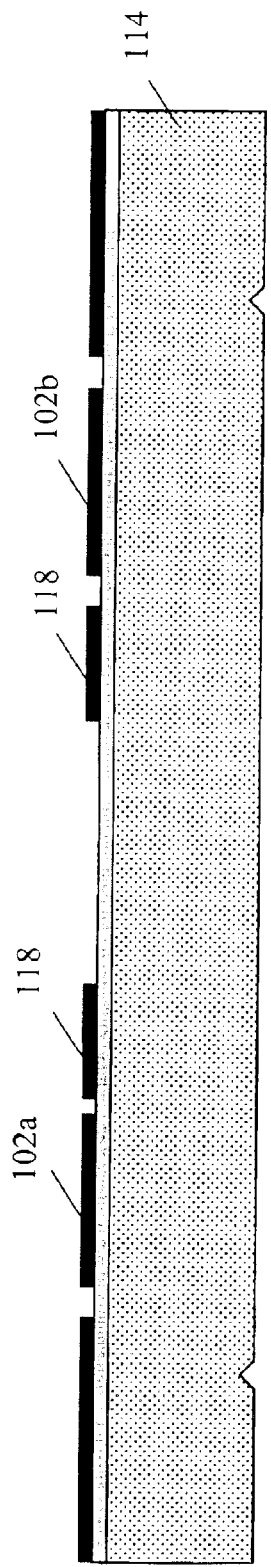
Figure 22:
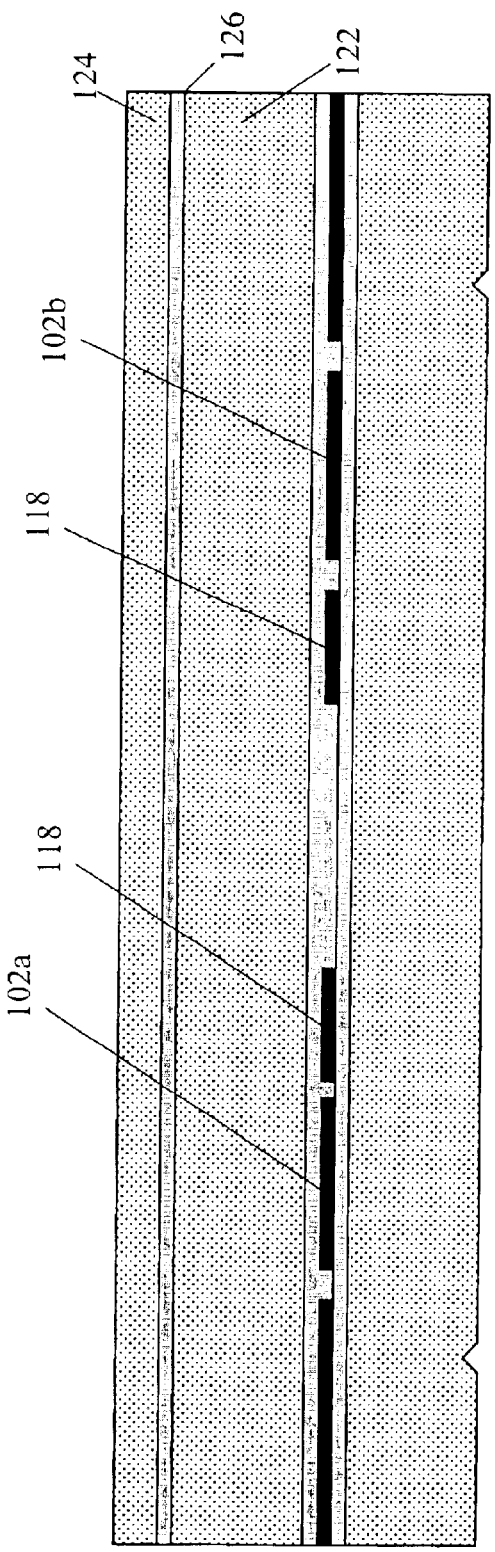

Those of skill in the art would appreciate that microactuator 100 may be fabricated by a number of fabrication methods. An example of one such fabrication method will now be explained in general with reference to FIGS. 21–26 and is based upon the method disclosed in U.S. Provisional Patent Application Serial No. 60/222,751 to Brosnihan, T., and Judy, M., filed on Aug. 3, 2000, entitled "Bonded Wafer Optical MEMS Process" converted to a regular patent application on Aug. 3, 2001. This application is hereby incorporated in its entirety by reference. The microactuator 100 includes substrate 114 on which is grown an oxide layer 120. The stationary plates 102a, 102b and touch-down plates 118 are next deposited on the substrate 114 in a conventional photolithography process as shown in FIG. 21. The plates 102a, 102b and 118 may be formed of polysilicon. As shown in FIG. 22, a three layer structure is formed by adding a spacer layer 122 and a bonded layer 124, both of which may be formed of single crystal silicon. The layers 122, 124 may be separated by an oxide layer 126.

In a next step shown in FIG. 23, polysilicon filled trenches 128 are formed down to the stationary plates 102a, 102b to allow electrical connection to the plates. The integrated circuit connections are then made to the stationary plates (as shown for example at 130 in FIG. 24) and to the portions of the bonded layer 124 which are to form the actuation plates (as shown for example at 132 in FIG. 24).

Figure 25:
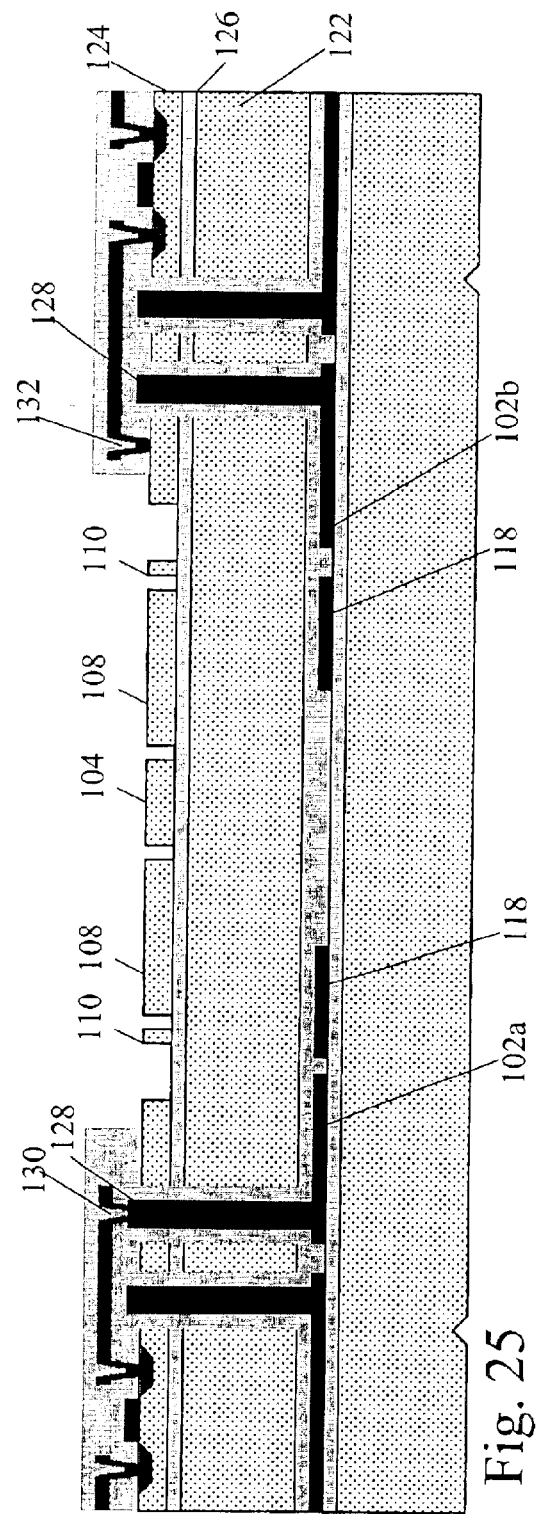
Figure 26:
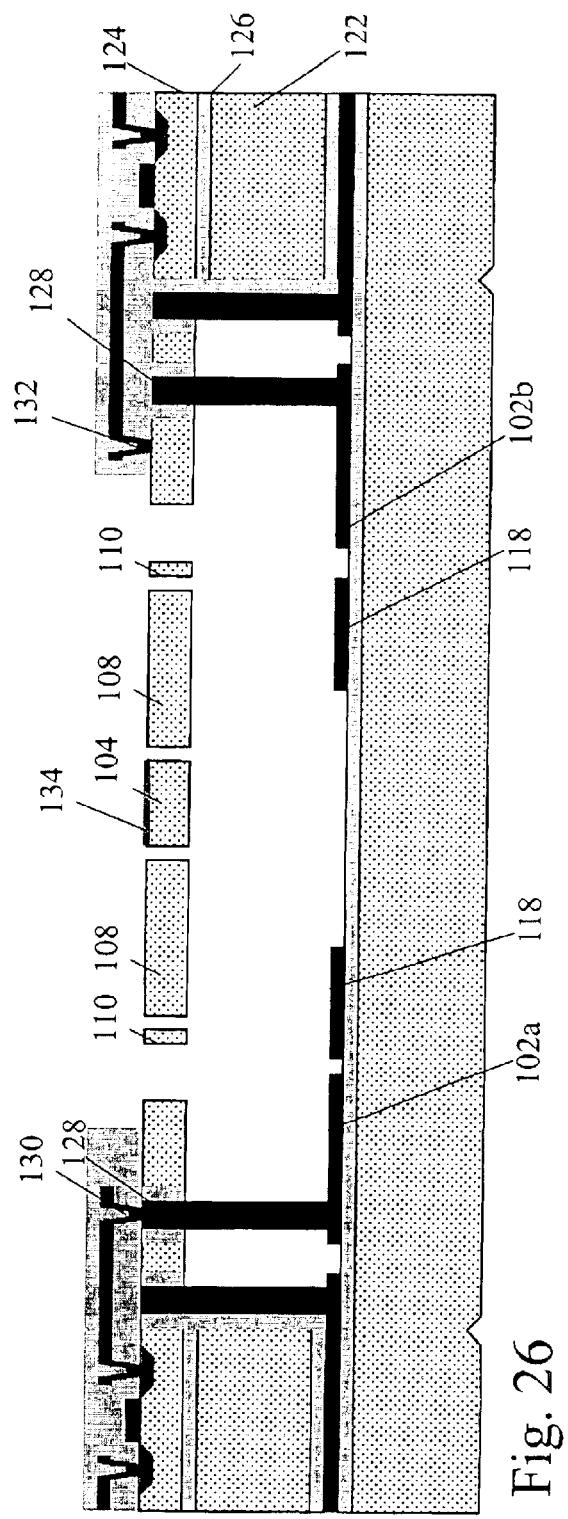

Portions of the foundry electronics layers are removed and bonded layer 124 is then patterned in a conventional etch process as shown in FIG. 25 to form the mirror base plate 104, actuation plates 108, and the microspring mechanisms 110. A generic pattern of the mirror base plate, actuation plates, and the microspring mechanisms is shown, not to scale, in FIG. 25. After the bonded layer 124 is etched, the sacrificial layer 122 beneath the patterned plates and microspring mechanisms is then etched away using xenon difluoride or the like as shown in FIG. 26 to release the base plate, actuation plate and microspring mechanisms. Finally, a shadow mask 134 of gold is then coated onto the mirror base plate layer to form the mirror. Those of skill in the art would appreciate that microactuator 100 may be formed by a variety of other processing steps.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

We claim:

1. A microactuator, comprising:
    a first plate;
    a second plate supported in a spaced relation to said first plate and having a first end, said second plate capable of actuation with respect to said first plate, said first plate capable of exerting an electrostatic force on said second plate upon application of a voltage potential between said first and second plates;
    a third plate having a first end pivotally coupled to said first end of said second plate, said third plate capable of actuation with respect to said first plate, actuation of said second plate at least assisting in actuation of said third plate; and
    at least one foot provided at said first end of said second plate and at said first end of said third plate for preventing the first ends of the second and third plates from contacting said first plate upon application of a voltage potential between said first and second plates.

2. A microactuator as recited in claim 1, wherein said third plate includes a mirror.

3. A microactuator as recited in claim 1, wherein said second plate is between two and ten times longer than said third plate.

4. A microactuator as recited in claim 1, wherein said second plate is between five and seven times longer than said third plate.

5. A microactuator, comprising:
    a substrate;
    a first plate fixed with respect to said substrate;
    a second plate anchored to said substrate and supported in a spaced relation to said first plate and capable of actuation with respect to said first plate, said first plate capable of exerting an electrostatic force on said second plate upon application of a voltage potential between said first and second plates;
    a spring mechanism;
    a third plate, pivotally coupled to said second plate via said spring mechanism and capable of actuation with respect to said substrate, actuation of said second plate at least assisting in actuation of said third plate.

6. A microactuator, comprising:
    a base layer including a first stationary electrode and a second stationary electrode;
    a first plate, including:
        a first end pivotally mounted in a spaced relation from said base layer,
        a second free end positioned adjacent said first stationary electrode and spaced from said first stationary electrode in an unbiased condition, and
        a central portion between said first and second end;
    a second plate, including:
        a first end pivotally mounted to said first plate at said central portion, and
        a second free end positioned adjacent said second stationary electrode and spaced from said second stationary electrode in an unbiased condition;
    a first voltage source for applying a first voltage to said first plate to generate a first electrostatic force between said first plate and said first electrode, said first electrostatic force capable of pivoting said first plate with respect to said base layer; and
    a second voltage source for applying a second voltage to said second plate to generate a second electrostatic force between said second plate and said second electrode, said second electrostatic force capable of pivoting said second plate with respect to said first plate.

7. A microactuator as recited in claim 6, wherein said first and second voltages are equal to each other.

8. A microactuator as recited in claim 6, wherein said first and second voltages are not equal to each other.

9. A microactuator as recited in claim 6, wherein said first voltage is applied at a same time as said second voltage.

10. A microactuator as recited in claim 6, wherein said first voltage is applied prior to said second voltage.

11. A microactuator as recited in claim 6, wherein pivoting of said first plate brings said second plate nearer to said second electrode to increase said second electrostatic force between said second plate and said second electrode.

12. A microactuator as recited in claim 5, wherein said third plate includes a mirror.

13. A microactuator as recited in claim 5, wherein said second plate is between two and ten times longer than said third plate.

14. A microactuator as recited in claim 5, wherein said second plate is between five and seven times longer than said third plate.

* * * * *